G. SWEET.
Plaster-Sowers.

No. 140,317. Patented June 24, 1873.

UNITED STATES PATENT OFFICE.

GEORGE SWEET, OF DANVILLE, NEW YORK.

IMPROVEMENT IN PLASTER-SOWERS.

Specification forming part of Letters Patent No. 140,317, dated June 24, 1873; application filed May 14, 1873.

*To all whom it may concern:*

Be it known that I, GEORGE SWEET, of Danville, in the county of Livingston, and in the State of New York, have invented certain new and useful Improvements in Plaster-Sowers; and do hereby declare that the following is a full, clear, and exact description thereof, reference being had to the accompanying drawings, and to the letters of reference marked thereon, making a part of this specification.

The nature of my invention consists in the construction and arrangement of a plaster or other fertilizer sower, as will be hereinafter more fully set forth.

In order to enable others skilled in the art to which my invention appertains to make and use the same, I will now proceed to describe its construction and operation, referring to the annexed drawing, in which—

Figure 1:
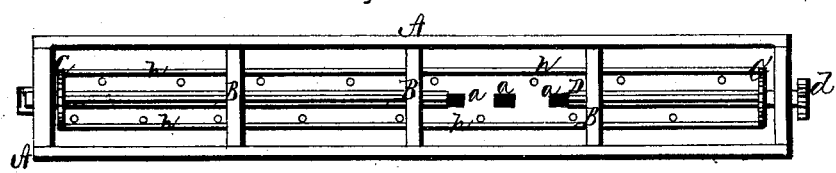
Figure 2:
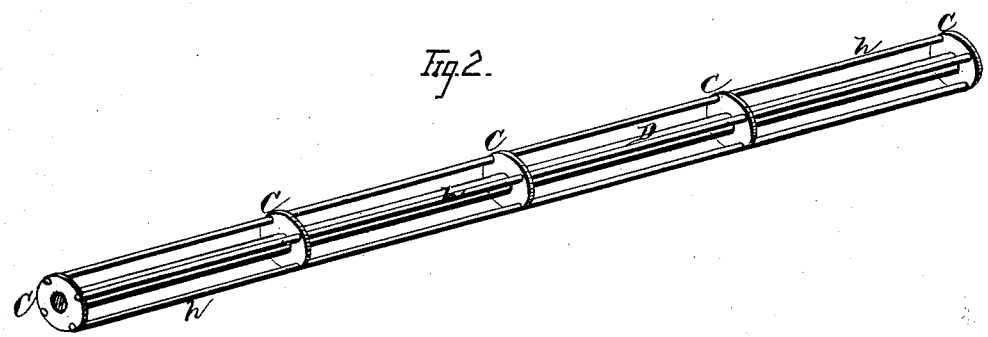
Figure 3:
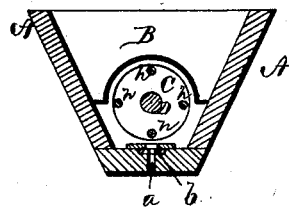

Figure 1 is a plan view of the fertilizer hopper; Fig. 2 is an enlarged perspective view of the interior heater or agitator; and Fig. 3 is a transverse vertical section of the hopper shown in Fig. 1.

A represents the hopper or box, in which the plaster or other fertilizer is placed to be sown. In the bottom of the hopper A is a series of apertures, $a$ $a$, and a perforated slide, $b$, for opening or closing said apertures. At suitable intervals in the hopper A are vertical cross-partitions B B, which are cut out at their lower ends for the reception of disks C C, which are secured on a central shaft, D, passing longitudinally through the hopper or box A. On one end of the shaft D on the outside of the box or hopper is a pinion, $d$, to gear with suitable gear-wheels on the frame of the machine so as to be revolved by the forward motion of the machine. On this shaft there is also a disk, C, near each end, immediately inside of the end-pieces of the hopper; and through all of said disks C C are passed four rods $h$ $h$, more or less, running the entire length of the hopper.

When the machine is in operation, and the shaft D with its disks and rods are revolving, said rods act as beaters to pulverize any and all lumps that may be in the plaster or fertilizer used.

Having thus fully described my invention, what I claim as new, and desire to secure by Letters Patent, is—

The skeleton beater, composed of the shaft D, straight longitudinal rods $h$ $h$, and disks C C, in combination with the hopper, having partitions B placed over the disks to form divisions in the hopper, all substantially as set forth.

In testimony that I claim the foregoing I have hereunto set my hand this 2d day of May, 1873.

GEORGE SWEET.

Witnesses:
TIMOTHY B. GRANT,
PHILANDER G. WHITE.